United States Patent
Zhang (12) United States Patent (10) Patent No.: US 12,503,061 B2
(45) Date of Patent: Dec. 23, 2025

(54) ROTARY ADJUSTMENT MECHANISM

(71) Applicant: Yanfeng International Automotive Technology Co., Ltd., Shanghai (CN)

(72) Inventor: Yin Zhang, Shanghai (CN)

(73) Assignee: Yanfeng International Automotive, Shanghai (CN)

( * ) Notice: Subject to any disclaimer, the term of this patent is extended or adjusted under 35 U.S.C. 154(b) by 164 days.

(21) Appl. No.: 18/573,254

(22) PCT Filed: Jul. 6, 2022

(86) PCT No.: PCT/CN2022/104157
§ 371 (c)(1),
(2) Date: Jul. 2, 2024

(87) PCT Pub. No.: WO2023/280219
PCT Pub. Date: Jan. 12, 2023

(65) Prior Publication Data
US 2024/0343205 A1    Oct. 17, 2024

(30) Foreign Application Priority Data
Jul. 7, 2021  (CN) .......................... 202110767589.8

(51) Int. Cl.
*B60R 11/02*    (2006.01)
*B60R 11/00*    (2006.01)

(52) U.S. Cl.
CPC ... *B60R 11/0229* (2013.01); *B60R 2011/0092* (2013.01)

(58) Field of Classification Search
CPC . B60R 11/0229; B60R 11/0235; F16M 11/18; F16M 13/02

USPC ................................................ 248/288.11
See application file for complete search history.

(56) References Cited

U.S. PATENT DOCUMENTS

| 5,337,188 A * | 8/1994 | do Espirito Santo ..... B60R 1/06 359/872 |
| 6,206,553 B1 * | 3/2001 | Boddy .................. B60R 1/1207 362/512 |
| 2020/0142191 A1 * | 5/2020 | Itsede ................ G02B 27/0149 |

FOREIGN PATENT DOCUMENTS

| CN | 108082056 | 5/2018 |
| CN | 209813861 | 12/2019 |
| CN | 113320480 | 8/2021 |
| CN | 113771771 | 12/2021 |

* cited by examiner

*Primary Examiner* — Todd M Epps
(74) *Attorney, Agent, or Firm* — Boyle Fredrickson S.C.

(57) ABSTRACT

A rotary adjusting mechanism is provided that includes a crank sliding block mechanism assembly and a driving motor assembly. The crank sliding block mechanism assembly includes a machine frame, a crank and a connection rod. The driving motor assembly is mounted on the machine frame and drives the crank. The crank is rotatably mounted on the machine frame by a first connection shaft. The connection rod used for mounting a screen is rotatably mounted on the crank by a second connection shaft. The machine frame has a guide groove. A sliding block linearly moves along a path defined by the guide groove. The connection rod is rotatably mounted on the sliding block by a third connection shaft. The first, second and third connection shafts extending in the z direction. The resulting device is simple in structure, small in the number of dimension chain control links, and high in mechanism reliability.

10 Claims, 7 Drawing Sheets

ROTARY ADJUSTMENT MECHANISM

CROSS REFERENCE TO RELATED APPLICATIONS

This application is a national application of international PCT/CN2022/105268, filed on Jul. 6, 2022, which claims priority to Chinese patent application 2021110767589.8, filed on Jul. 7, 2021, the contents of each of which are hereby incorporated by reference.

BACKGROUND OF THE INVENTION

1. Field of the Invention

The present invention relates to a rotary adjustment for the automobile central screen, and more specifically relates to a rotary adjustment mechanism.

2. Related Art

The vehicle is usually described with the help of three spatial directions that extend vertically from each other, wherein a longitudinal x corresponds to the driving direction of the vehicle in the horizontal orientation, a transverse y is perpendicular to the longitudinal x in the horizontal orientation and corresponds to the width of the vehicle, and a vertical direction z corresponds to the height direction of the vehicle and is perpendicular to the longitudinal x and transverse y. The automobile rotating screen in the prior art is generally rotated around the longitudinal x or transverse y, and the screen cannot be rotated around the vertical direction z. However, only the screen rotating around the vertical direction z can realize the perspective switching between the main driver and co-driver, which has a very good market prospect.

SUMMARY OF THE INVENTION

To solve the above-mentioned problem that the screen cannot be rotated around the vertical direction z in the prior art, the invention provides a rotary adjusting mechanism.

The rotary adjusting mechanism of the present invention comprises a crank sliding block mechanism assembly and a driving motor assembly, wherein the crank sliding block mechanism assembly comprises a machine frame, a crank and a connection rod, wherein the driving motor assembly is mounted on the machine frame and drives a crank, wherein the crank is rotatably mounted on the machine frame by means of a first connection shaft, wherein the connection rod used for mounting a screen is rotatably mounted on the crank by means of a second connection shaft, wherein the machine frame is provided with a guide groove, wherein a sliding block linearly moves along a path defined by the guide groove, and wherein the connection rod is rotatably mounted on the sliding block by means of a third connection shaft.

Preferably, the machine frame has a convex portion, wherein the crank has a connecting portion and parallel first and second clamping plates extending perpendicularly from the connecting portion, and wherein the convex portion is inserted between the first and second clamping plates.

Preferably, the machine frame provides two travel stop points respectively on both sides of the convex portion, and wherein the contact between the connecting portion and each travel stop point limits the rotation range of the screen.

Preferably, the crank sliding block mechanism assembly further comprises first and second bushings inserted into a through hole of the convex portion, and wherein the first connection shaft has a first smooth shaft segment that is rotatably matched with the first and second bushings.

Preferably, a through hole of the crank is provided with a first threaded hole segment, wherein the first connection shaft has a first threaded segment, and wherein the first threaded segment is locked with the first threaded hole segment to relatively fix the first connection shaft to the crank.

Preferably, the crank sliding block mechanism assembly further comprises third and fourth bushings inserted into a through hole of the connection rod, and wherein the second connection shaft has a second smooth shaft segment that is rotatably matched with the third and fourth bushings.

Preferably, a connecting hole of the crank is provided with a second threaded hole segment, wherein the second connection shaft has a second threaded segment, and wherein the second threaded segment is locked with the second threaded hole segment to relatively fix the second connection shaft to the crank.

Preferably, the crank sliding block mechanism assembly further comprises fifth and sixth bushings inserted into another through hole of the connection rod, and wherein the third connection shaft has a third smooth shaft segment that is rotatably matched with the fifth and sixth bushings.

Preferably, a through hole of the sliding block is provided with a third threaded hole segment, wherein the third connection shaft has a third threaded segment, and wherein the third threaded segment is locked with the third threaded hole segment to relatively fix the third connection shaft to the sliding block.

Preferably, the crank is provided with a motor shaft matching hole, wherein the driving motor assembly is provided with a motor output shaft, and wherein the motor output shaft is inserted into the motor shaft matching hole to drive the crank by means of the driving motor assembly.

Preferably, the machine frame is fixed to the car body and is provided with motor mounting threaded holes, wherein the driving motor assembly is provided with motor mounting through holes, and wherein assembly connecting bolts pass through the motor mounting through holes and are inserted into the motor mounting threaded holes to mount the driving motor assembly on the machine frame.

By means of the arrangement of the first, second and third connection shafts extending in the z direction, the rotary adjusting mechanism of the present invention enables the screen mounted on the connection rod to bidirectionally rotate around the z direction, is simple in structure, small in the number of dimension chain control links, and high in mechanism reliability. In addition, by means of the design of the crank, bushings and the threaded segments, the clearance in each direction of the rotary adjusting mechanism of the present invention becomes smaller, and the screen shaking amount can be controlled better.

DESCRIPTION OF THE ENABLING EMBODIMENT

In conjunction with the accompanying drawings, preferred embodiments of the present invention are given and described in detail below.

Figure 1:
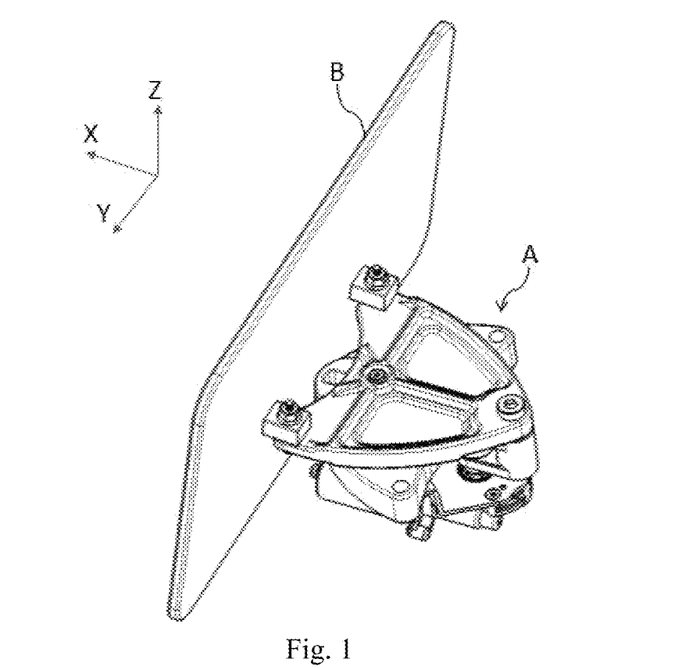
FIG. 1 is a schematic view of the overall structure of the rotary adjusting mechanism on which a screen is mounted according to a preferred embodiment of the present invention.
Figure 2:
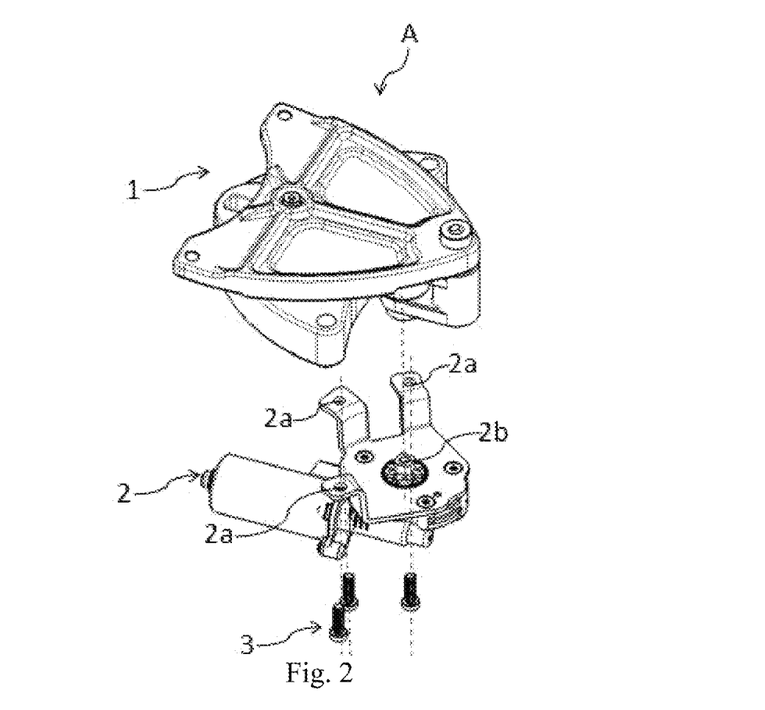
FIG. 2 is an exploding view of the rotary adjusting mechanism of FIG. 1.
Figure 3:
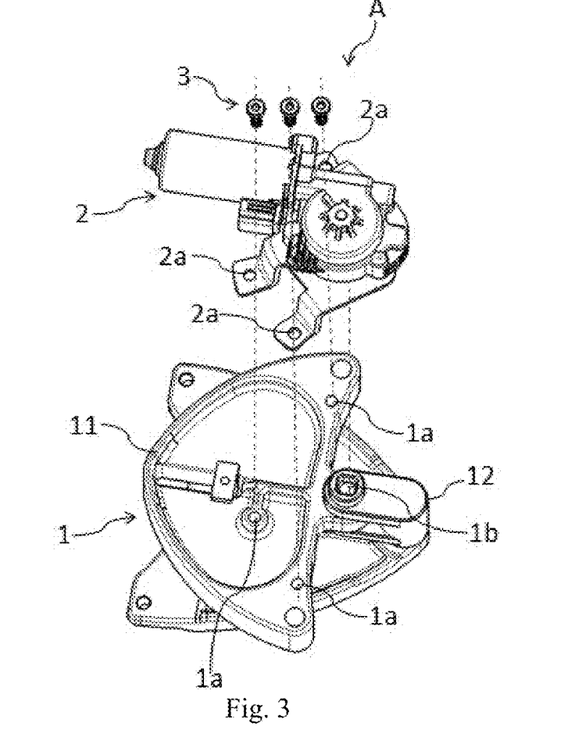
FIG. 3 is an upward view of the rotary adjusting mechanism of FIG. 2.

As shown in FIG. 1, a rotary adjusting mechanism A according to a preferred embodiment of the present invention is used for supporting a screen B and enabling the screen B to rotate around the vertical direction z. As shown in FIGS. 2-3, the rotary adjusting mechanism A comprises a crank sliding block mechanism assembly 1, a driving motor assembly 2 and assembly connecting bolts 3, wherein the driving motor assembly 2 is mounted on the crank sliding block mechanism assembly 1 by means of the assembly connecting bolt 3. Specifically, the bottom of the crank sliding block mechanism assembly 1 is provided with three motor mounting threaded holes 1a, the driving motor assembly 2 is provided with three motor mounting through holes 2a, and three assembly connecting bolts 3 pass through the motor mounting through holes 2a and are inserted into the motor mounting threaded holes 1a to mount the driving motor assembly 2 on the crank sliding block mechanism assembly 1. In addition, the bottom of the crank sliding block mechanism assembly 1 is provided with a motor shaft matching hole 1b, the driving motor assembly 2 is provided with a motor output shaft 2b, and the motor output shaft 2b is inserted into the motor shaft matching hole 1b to drive the crank sliding block mechanism assembly 1 by means of the driving motor assembly 2. In this embodiment, the motor shaft matching hole 1b is a square shaft matching hole, and the motor output shaft 2b is a motor output square shaft, whereby a shape fit is realized. It should be understood that other shafts (such as cross shafts and stellate shafts) can likewise be used in the present invention.

Figure 4:
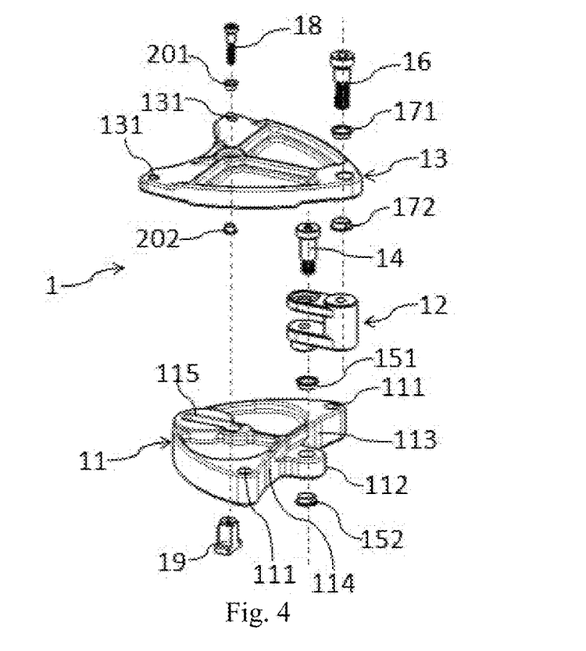
FIG. 4 is an exploding view of the crank sliding block mechanism assembly of the rotary adjusting mechanism of FIG. 2.
Figure 5:
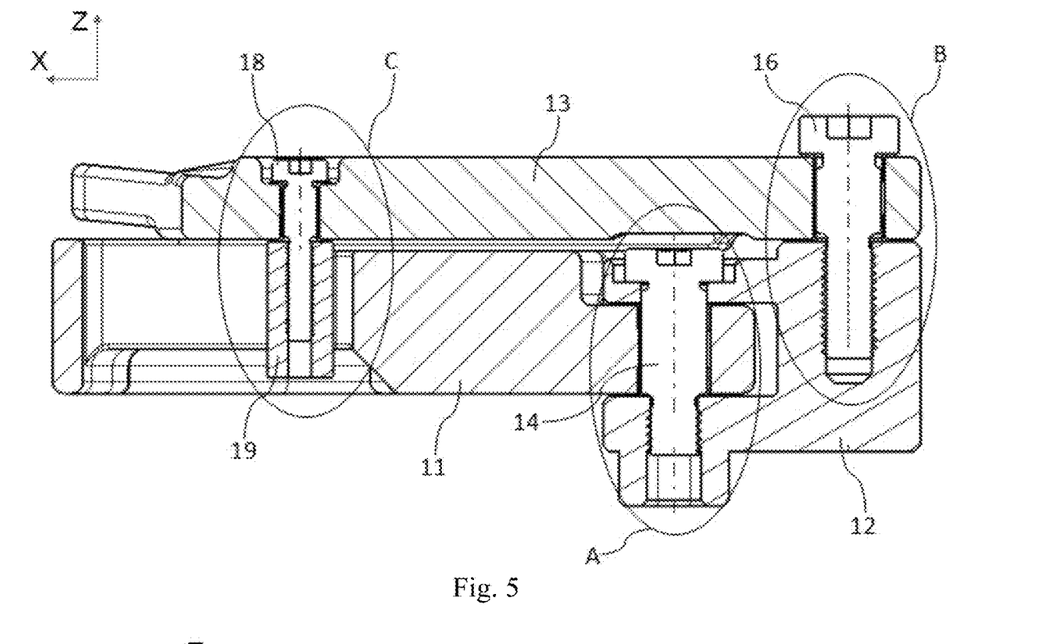
FIG. 5 is a cross-sectional view of the crank sliding block mechanism assembly of the rotary adjusting mechanism of FIG. 2.

As shown in FIG. 4, the crank sliding block mechanism assembly 1 comprises a machine frame (i.e., bracket) 11, a crank 12 and a connection rod (i.e., forkarm) 13. The machine frame 11 is provided with body fixing threaded holes 111, and body fixing threaded bolts pass through the body fixing threaded holes 111 to connect and fix the machine frame 11 to car body. The motor mounting threaded holes 1a are provided at the bottom of the machine frame 11 (see FIG. 3), the assembly connecting bolts 3 are inserted into the motor mounting threaded holes 1a to connect and fix the driving motor assembly 2 to the machine frame 11. The crank 12 is rotatably mounted on the machine frame 11, and the motor shaft matching hole 1b is provided at the bottom of the crank 12 (see FIG. 3) to drive the rotation of the crank 12 by means of the driving motor assembly 2. The connection rod 13 is rotatably mounted on the crank 12. The connection rod 13 is provided with screen mounting holes 131, in conjunction with FIG. 1, the screen B is fixed on the connection rod 13 by inserting the screen mounting bolts into the screen mounting holes 131 and moves with the connection rod 13.

Figure 6:
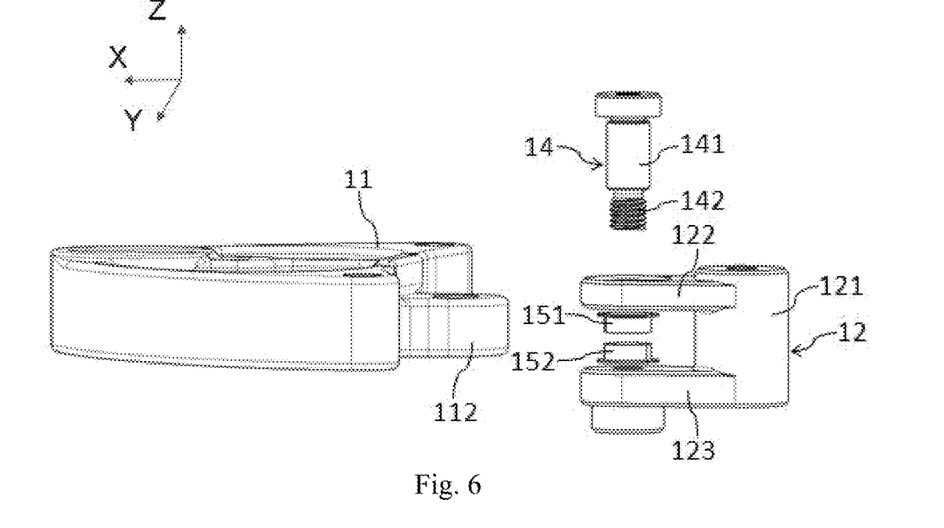
FIG. 6 is a partial enlarged view of FIG. 4.
Figure 7:
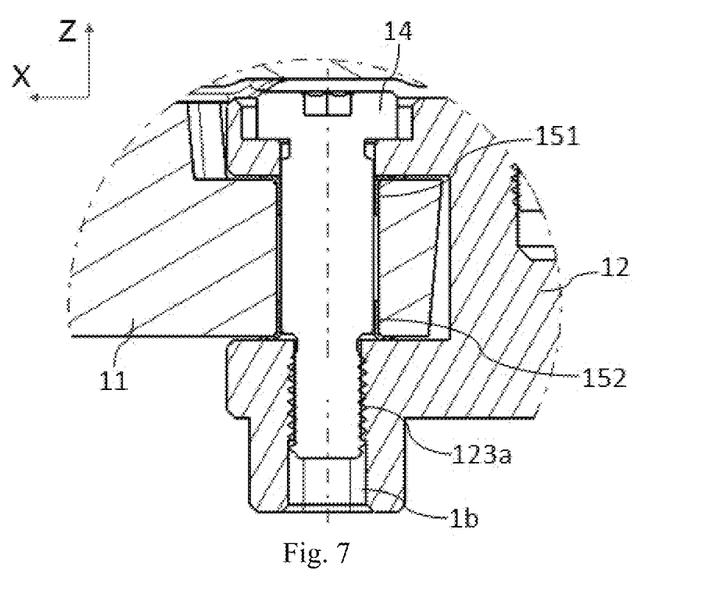
FIG. 7 is an enlarged view of area A in FIG. 5.

As shown in FIGS. 4-7, the crank sliding block mechanism assembly 1 further comprises a first connection shaft 14 for defining a hinged axis of the crank 12 relative to the machine frame 11, and the crank 12 is rotatably mounted on the machine frame 11 by means of the first connection shaft 14. In this embodiment, the first connection shaft 14 is a first bolt. Specifically, as shown in FIGS. 4, 6, the machine frame 11 has a convex portion 112 extending out in the x direction and provides a first travel stop point 113 and a second travel stop point 114 respectively on both sides of the convex portion 112. The crank sliding block mechanism assembly 1 further comprises a first bushing 151 and a second bushing 152 inserted into a through hole of the convex portion 112 from the top and bottom respectively. The crank 12 has a connecting portion 121 extending in the z direction and parallel first and second clamping plates 122, 123 extending perpendicularly from the connecting portion 121. A through hole of the second clamping plate 123 is provided with a first threaded hole segment 123a (see FIG. 7). The convex portion 112 of the machine frame 11 is inserted between the first clamping plate 122 and the second clamping plate 123. The first connection shaft 14 has a first smooth shaft segment 141 and a first threaded segment 142. With reference to FIGS. 6-7, the first smooth shaft segment 141 is matched with inner holes of the first and second bushings 151, 152, and can rotate relative around the axis of the inner holes of the first and second bushings 151, 152. The first threaded segment 142 is locked with the first threaded hole segment 123a. The first connection shaft 14 remain relatively stationary without external force after being preloaded with the crank 12. In addition, as shown in FIG. 7, the first threaded hole segment 123a of the second clamping plate 123 is coaxially penetrated with the motor shaft matching hole 1b, and the motor output shaft 2b of the driving motor assembly 2 (see FIG. 2) is inserted into the second clamping plate 123 to drive the crank 12 rotating synchronously around the axis of the motor output shaft 2b. Thus, the crank 12 and the first connection shaft 14 rotate synchronously around the axis of the inner holes of the first and second bushings 151, 152. In particular, the crank 12 is deformed along the axial direction by a larger axial preload of the first connection shaft 14. The axial clearance between the machine frame 11 and the crank 12 is reduced. Thus, the movement in the z direction and the rotation around the x/y direction of the crank 12 relative to the machine frame 11 is thereby restricted by the first connection shaft 14.

Figure 8:
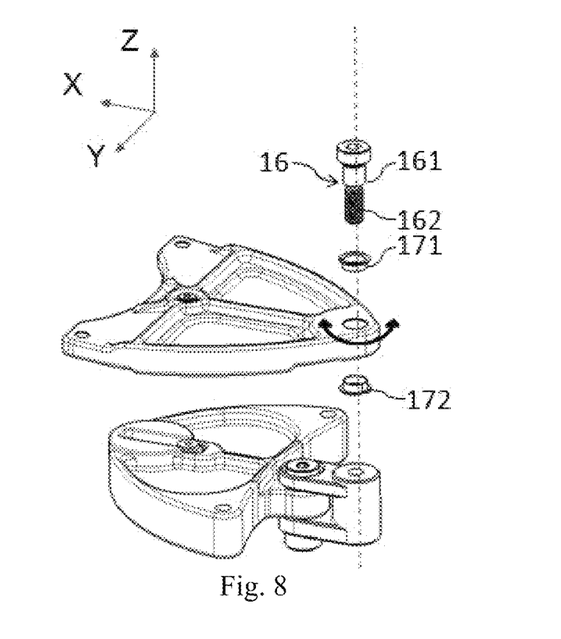
FIG. 8 is another partial enlarged view of FIG. 4.
Figure 9:
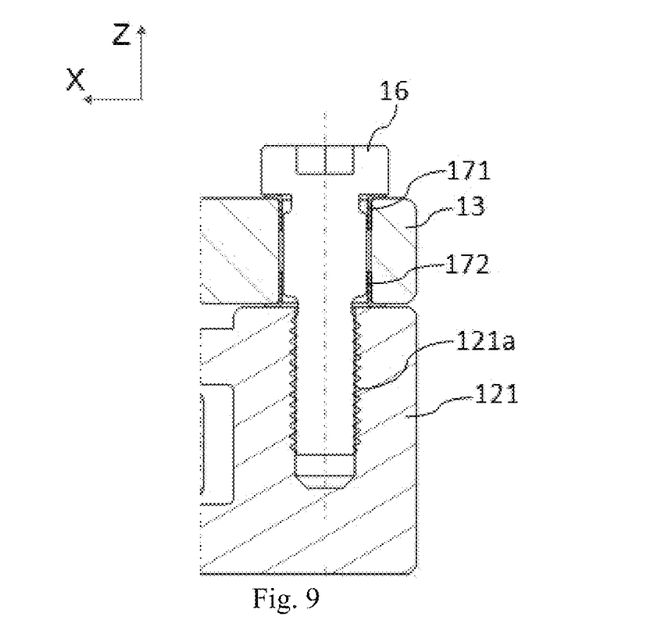
FIG. 9 is an enlarged view of area B in FIG. 5.

As shown in FIGS. 4-5, FIGS. 8-9, the crank sliding block mechanism assembly 1 further comprises a second connection shaft 16 for defining a hinged axis of the connection rod 13 relative to the crank 12, and the connection rod 13 is rotatably mounted on the crank 12 by means of the second connection shaft 16. In this embodiment, the second connection shaft 16 is a second bolt. In addition, the crank sliding block mechanism assembly 1 further comprises a third bushing 171 and a fourth bushing 172 inserted into a through hole of the connection rod 13 from the top and bottom respectively. As shown in FIG. 8, the second connection shaft 16 has a second smooth shaft segment 161 and a second threaded segment 162. As shown in FIG. 9, a connecting hole of the connecting portion 121 of the crank 12 is provided with a second threaded hole segment 121a. The second smooth shaft segment 161 is matched with inner holes of the third and fourth bushings 171, 172, and can rotate relative around the axis of the inner holes of the third and fourth bushings 171, 172. The second threaded segment 162 is locked with the second threaded hole segment 121a. The second connection shaft 16 remains relatively stationary without external force after being preloaded with the crank 12. When the crank 12 rotates, the connection rod 13 and the third and fourth bushings 171, 172 do a rotary motion around the axis of the second connection shaft 16. In particular, the movement in the z direction and the rotation around the x/y direction of the connection rod 13 relative to the crank 12 is thereby restricted by the second connection shaft 16.

Figure 10:
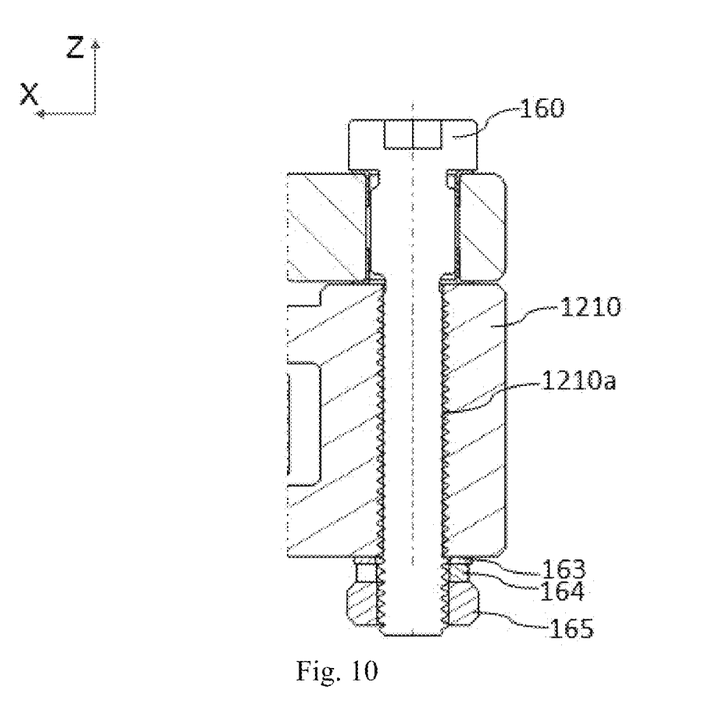
FIG. 10 is a schematic view of another embodiment corresponding to FIG. 9.

As shown in FIG. 10, in another embodiment, the connecting hole of the connecting portion 1210 is disposed as a through hole, and a flat gasket 163, an elastic gasket 164 and a nut 165 are additionally added to increase the loosening torque of the second connection shaft 160, to prevent the second connection shaft 160 from rotating relative to the axis of the second threaded hole segment 1210a after preloading.

Figure 11:
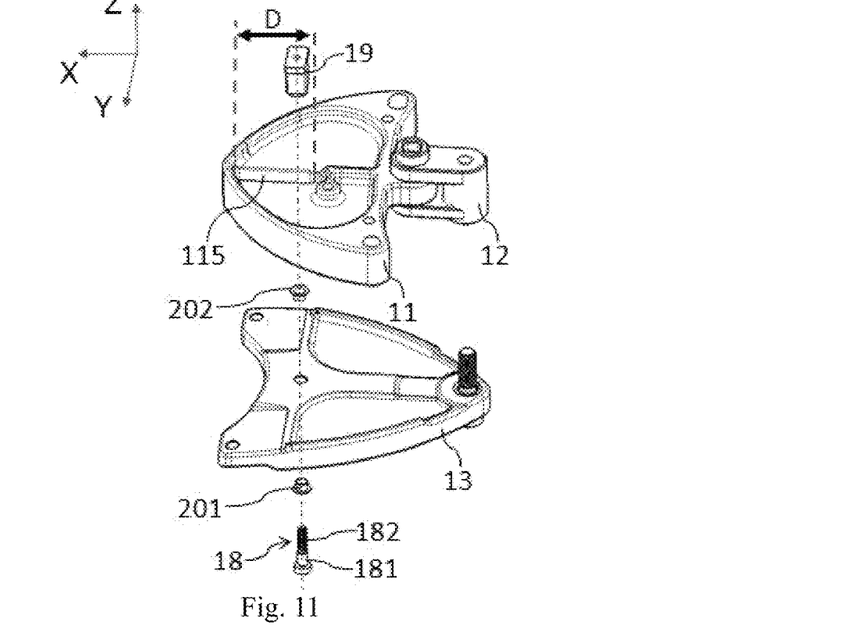
FIG. 11 is yet another partial enlarged view of FIG. 4.
Figure 12:
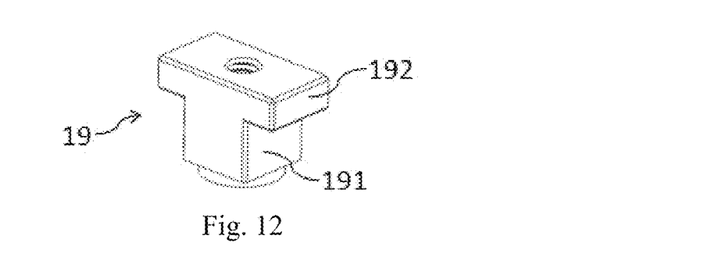
FIG. 12 is an enlarged view of the sliding block of FIG. 11.
Figure 13:
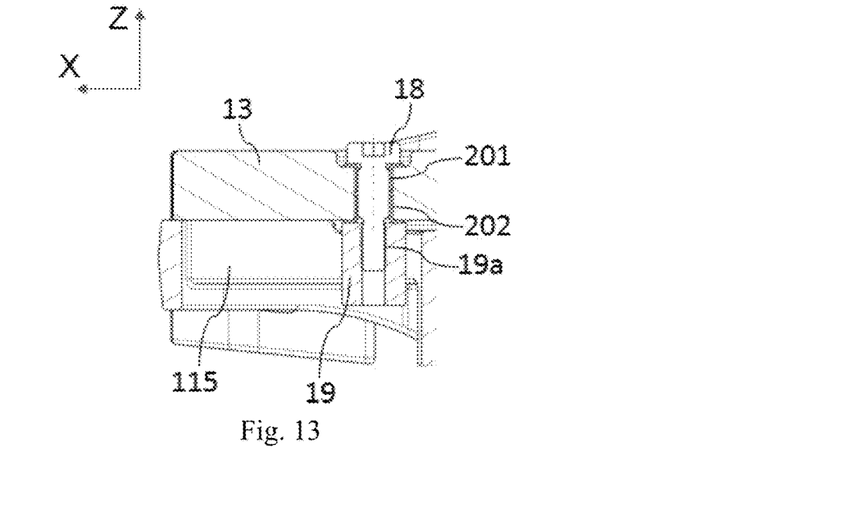
FIG. 13 is an enlarged view of area C in FIG. 5.

As shown in FIGS. 4-5, FIGS. 11-13, the crank sliding block mechanism assembly 1 further comprises a third connection shaft 18 and a sliding block 19, wherein the sliding block 19 is movably mounted on the machine frame 11, and the third connection shaft 18 is disposed between the connection rod 13 and the sliding block 19 so that the connection rod 13 is rotatably mounted on the sliding block 19 by means of the third connection shaft 18. In this embodiment, the third connection shaft 18 is a third bolt. In addition, the crank sliding block mechanism assembly 1 further comprises a fifth bushing 201 and a sixth bushing 202 inserted into a through hole of the connection rod 13 from the top and bottom respectively. As shown in FIG. 11, the machine frame 11 has a guide groove 115 extending in the x direction. As shown in FIG. 12, the sliding block 19 has a main body 191 and flange feature 192 extending in the y direction from the main body 191. As shown in FIG. 13, the main body 191 can linearly move along a path D (see FIG. 11) defined by the guide groove 115. As shown in FIG. 11, the third connection shaft 18 has a third smooth shaft segment 181 and a third threaded segment 182. As shown in FIG. 13, a through hole of the sliding block 19 is provided with a third threaded hole segment 19a. The third smooth shaft segment 181 is matched with inner holes of the fifth and sixth bushings 201, 202, and can rotate relative around the axis of the inner holes of the fifth and sixth bushings 201, 202. The third threaded segment 182 is locked with the third threaded hole segment 19a. The third connection shaft 18 remains relatively stationary without external force after being preloaded with the sliding block 19. When the crank 12 rotates, the connection rod 13 and the fifth and sixth bushings 201, 202 do a rotary motion around the axis of the third connection shaft 18. During the rotation, the connection rod 13 and the fifth and sixth bushings 201, 202 remain relatively stationary. In particular, the movement in the z direction and the rotation around the x/y direction of the connection rod 13 relative to the machine frame 11 is thereby restricted by the third connection shaft 18 together with the sliding block 19.

Figure 14:
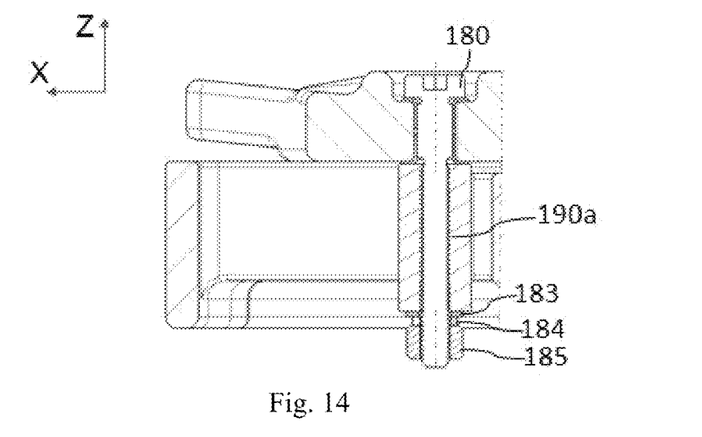
FIG. 14 is a schematic view of yet another embodiment corresponding to FIG. 13.

As shown in FIG. 14, in yet another embodiment, a flat gasket 183, an elastic gasket 184 and a nut 185 are added to increase the loosening torque of the third connection shaft 180, to prevent the third connection shaft 180 from rotating relative to the axis of the third threaded hole segment 190a after preloading.

Figure 15:
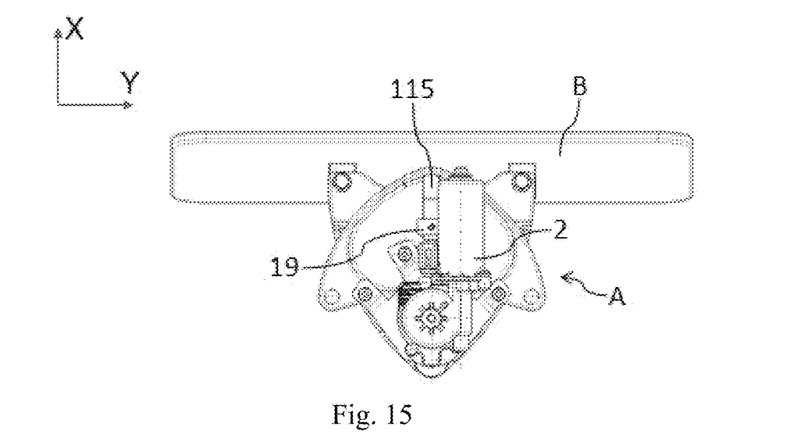
FIG. 15 shows an initial state of the rotary adjusting mechanism on which the screen is mounted according to the present invention.

FIG. 15 shows an initial state of the rotary adjusting mechanism A on which the screen B is mounted, wherein the sliding block 19 is positioned at one end of the guide groove 115 far away from the screen B. In particular, the driving motor assembly 2 is equipped with a reverse locking ability, that is, the driving motor assembly 2 has a self-locking function, and the screen B is guaranteed to be unable to be reversed driven when the motor is powered off, so that the lock of the screen B at any rotation position is realized.

Figure 16:
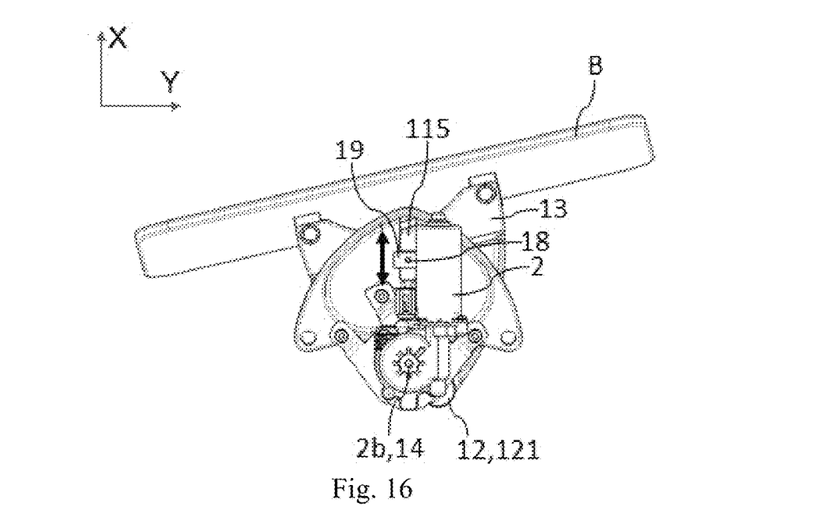
FIG. 16 shows a rotation state of the rotary adjusting mechanism on which the screen is mounted according to the present invention.

FIG. 16 shows a rotation state of the rotary adjusting mechanism A on which the screen B is mounted. The driving motor assembly 2 drives the crank 12 to rotate synchronously around the axis of the motor output shaft 2b (i.e., the axis of the first connection shaft 14), and the connection rod 13 rotates around the axis of the third connection shaft 18, and the sliding block 19 that is attached to the third connection shaft 18 does translation along the guide groove 115. Thus, the rotation around the z direction and the movement perpendicular to the z plane of the screen B are synchronously realized. When the connecting portion 121 of the crank 12 contacts with the first travel stop point (see FIG. 4), the screen B stops rotating to provide the co-driver mode. When the connecting portion 121 of the crank 12 is rotated in the opposite direction and contacts with the second travel stop point 114 (see FIG. 4), the screen B stops rotating to the provide the main driver mode.

The foregoing description refers to preferred embodiments of the present invention and is not intended to limit the scope of the present invention. Various changes can be made to the foregoing embodiments of the present invention. All simple and equivalent changes and modifications made in accordance with the claims of the present invention and the content of the description fall into the protection scope of the patent of the present invention. What is not described in detail in the present invention is conventional technical content.

What is claimed is:

1. A rotary adjusting mechanism, comprising:
    a crank sliding block mechanism assembly and a driving motor assembly,
    wherein the crank sliding block mechanism assembly comprises a machine frame, a crank and a connection rod,
    wherein the driving motor assembly is mounted on the machine frame and drives a crank,
    wherein the crank is rotatably mounted on the machine frame by means of a first connection shaft,
    wherein the connection rod used for mounting a screen is rotatably mounted on the crank by means of a second connection shaft,
    wherein the machine frame is provided with a guide groove,
    wherein a sliding block linearly moves along a path defined by the guide groove, and
    wherein the connection rod is rotatably mounted on the sliding block by means of a third connection shaft.

2. The rotary adjusting mechanism according to claim 1, wherein the machine frame has a convex portion, wherein the crank has a connecting portion and parallel first and second clamping plates extending perpendicularly from the connecting portion, and wherein the convex portion is inserted between the first and second clamping plates.

3. The rotary adjusting mechanism according to claim 2, wherein the machine frame provides two travel stop points respectively on both sides of the convex portion, and wherein the contact between the connecting portion and each travel stop point limits the rotation range of the screen.

4. The rotary adjusting mechanism according to claim 2, wherein the crank sliding block mechanism assembly further comprises first and second bushings inserted into a through hole of the convex portion, and wherein the first connection shaft has a first smooth shaft segment that is rotatably matched with the first and second bushings.

5. The rotary adjusting mechanism according to claim 1, wherein a through hole of the crank is provided with a first threaded hole segment, wherein the first connection shaft has a first threaded segment, and wherein the first threaded segment is locked with the first threaded hole segment to relatively fix the first connection shaft to the crank.

6. The rotary adjusting mechanism according to claim 1, wherein the crank sliding block mechanism assembly further comprises third and fourth bushings inserted into a through hole of the connection rod, and wherein the second connection shaft has a second smooth shaft segment that is rotatably matched with the third and fourth bushings.

7. The rotary adjusting mechanism according to claim 1, wherein a connecting hole of the crank is provided with a second threaded hole segment, wherein the second connection shaft has a second threaded segment, and wherein the second threaded segment is locked with the second threaded hole segment to relatively fix the second connection shaft to the crank.

8. The rotary adjusting mechanism according to claim 1, wherein the crank sliding block mechanism assembly further comprises fifth and sixth bushings inserted into another through hole of the connection rod, and wherein the third connection shaft has a third smooth shaft segment that is rotatably matched with the fifth and sixth bushings.

9. The rotary adjusting mechanism according to claim 1, wherein a through hole of the sliding block is provided with a third threaded hole segment, wherein the third connection shaft has a third threaded segment, and wherein the third threaded segment is locked with the third threaded hole segment to relatively fix the third connection shaft to the sliding block.

10. The rotary adjusting mechanism according to claim 1, wherein the crank is provided with a motor shaft matching hole, wherein the driving motor assembly is provided with a motor output shaft, and wherein the motor output shaft is inserted into the motor shaft matching hole to drive the crank by means of the driving motor assembly.

* * * * *